(12) United States Patent
Tsao et al.

(10) Patent No.: US 6,404,384 B1
(45) Date of Patent: Jun. 11, 2002

(54) METHOD OF SPOKE FILLING AND SPOKE FILLING PROCESSING UNIT FOR RADAR SCAN CONVERTER

(75) Inventors: Yon-Ji Tsao, Taipei; Fu-Min Yeh, Tauyuan; Guang-Sheen Liu, Taoyuan Hsien, all of (TW)

(73) Assignee: Chung-Shan Institute of Science and Technology, Taoyuan (TW)

(*) Notice: Subject to any disclaimer, the term of this patent is extended or adjusted under 35 U.S.C. 154(b) by 0 days.

(21) Appl. No.: 09/871,208

(22) Filed: May 31, 2001

(51) Int. Cl.[7] .................... G01S 7/298; G01S 7/04
(52) U.S. Cl. ................ 342/185; 342/175; 342/176; 342/195
(58) Field of Search ................ 342/134–144, 342/175–186, 190, 191, 195, 196, 197; 375/240, 240.01

(56) References Cited

U.S. PATENT DOCUMENTS

| | | | |
|---|---|---|---|
| 4,127,873 A | * 11/1978 | Katagi | .......... 342/185 X |
| 4,697,185 A | 9/1987 | Thomas et al. | |
| 4,774,516 A | * 9/1988 | Henri et al. | .......... 342/185 |
| 5,530,450 A | 6/1996 | Sohn et al. | |
| 5,554,992 A | 9/1996 | Toth et al. | |
| 5,923,285 A | * 7/1999 | Andrusiak et al. | .......... 342/177 |
| 6,211,814 B1 | * 4/2001 | Benjamin et al. | .......... 342/185 |

* cited by examiner

Primary Examiner—Bernarr E. Gregory
(74) Attorney, Agent, or Firm—J.C. Patents

(57) ABSTRACT

A method of spoke filling for radar scan converter and the spoke filling processing unit for the same are provided, the radar scan converter having a buffer, an overlay processor, and the spoke filling processing unit. The spoke filling processing unit comprises a first multiplexer, a second multiplexer, a timing generator, a data storage unit and a finite state machine. The spoke filling processing unit can effectively fill the spokes while avoiding collision occurrence and, through the finite state machine thereof, can control the electrical circuit operation.

7 Claims, 8 Drawing Sheets

① : Coordinate Sector ➔ : Spoke Filling Direction

| address (10bits) | data (10bits) | video (8bits) | sector (2bits) |
|---|---|---|---|
| 0 | 511 | 6 | 01 |
| 1 | 512 | 6 | 01 |
| 2 | 513 | 6 | 01 |
| ⋮ | ⋮ | ⋮ | ⋮ |
| 511 | 511 | 5 | 01 |
| 512 | 512 | 6 | 01 |
| 513 | 511 | 6 | 10 |
| 514 | 510 | 6 | 10 |
| ⋮ | ⋮ | ⋮ | ⋮ |
| 1021 | 510 | 6 | 10 |
| 1022 | 511 | 5 | 10 |
| 1023 | 512 | 5 | 10 |

FIG. 11

METHOD OF SPOKE FILLING AND SPOKE FILLING PROCESSING UNIT FOR RADAR SCAN CONVERTER

BACKGROUND OF THE INVENTION

1. Field of the Invention

The invention relates to a method of spoke filling for radar scan converter and a spoke filling processing unit for the same.

2. Description of the Related Art

FIG. 1 shows a block diagram of a conventional radar scan converter. The radar scan converter 100 shown in FIG. 1 is a new generation of plan position indicator prominent in the technology trend. The used method converts the polar coordinates of the radar video into Cartesian coordinates through the coordinate converter 102. The cartesian coordinates then are output in a raster scan fashion to the monitor 104. Because of the innate characteristics of the coordinate conversion, the correspondence between the echoes and the conversion into cartesian coordinate points is different depending on whether the echoes are at short distance, medium distance, or long distance from the reference point of the radar sweep line. In the case where the polar video points are in short distance, there is no one-to-one correspondence between the polar video points and the corresponding Cartesian points, and more than one polar points can correspond to a single Cartesian point. This occurrence of point repeated hitting is conventionally called "collision". The collision can cause the lifetime of the display point to be shortened. In the case where the echoes are at medium distance, the one-to-one correspondence can be obtained. And, at long distance, there are many cartesian points that cannot be corresponded to any polar point, which causes the occurrence of spokes.

In FIG. 1, the AZ_sync signal, delivered to the coordinate converter 102 and the FIFO buffer 106, is the radar azimuth signal that comprises the azimuth reference pulse (ARP) and the azimuth change pulse (ACP). When the antenna rotates, each scan has 4096 azimuth change pulses (ACP) and 1 azimuth reference pulse (ARP), the azimuth reference pulse (ARP) appears when the antenna faces to the north during the rotation. The Trigger signal delivered to the coordinate converter 102, the timing generator 108 and the A/D converter 110 represents the moment when the radar wave is triggered and from which the counting of the distance starts. According to the signals AZ_sync and Trigger, the coordinate converter 102 evaluates the polar coordinates $(r, \theta)$ of the radar video that then are converted into Cartesian coordinates $(x, y)$. According to the Cartesian coordinates $(x, y)$ of the points, the occurrence of spokes between the two neighboring sweep lines are determined, the spoke filling then is performed via the spoke filling processing unit 112. The overlay processor 114 integrates the radar video, the graphic and the text which are generated from the computer display unit (not shown).

FIG. 2 illustrates the method of spoke filling calculation procedure, according to the U.S. Pat. No. 4,697,185 issued to Thomas et al. If $0° \leq \theta \leq 45°$, a point $(x_i, y_i)$ is selected on the sweep line L.

(1) A point $(x_i', y_i')$ is selected on the sweep line L' next to the sweep line L, wherein $y_i = y_i'$, and $x_i' = r \cos\theta \tan\theta'$ from the geometrical relationship.

(2) If $x_i' - x_i > 1$, there is at least a spoke occurrence; the series $x_{i+1} = x_i + 1$ is then constructed till $x_i' - x_{1+n} \leq 1$, such that the n points $(x_{i+1}, y_i), (x_{1+2}, y_i), \ldots, (x_{i+n}, y_i)$ are filled up (this filling fashion is called horizontal fashion spoke filling).

(3) As shown in FIG. 2, the video value of the point $(x_{i+1}, y_i)$ is taken from the video value of the point P which distance from the reference center O on the sweep line L is $r + \sin\theta$. In the same manner, the video value of the point $(x_{i+2}, y_i)$ is taken from the video value of the point Q which distance from the reference center O on the sweep line L is $r + 2\sin\theta$, etc. till $r + n\sin\theta$.

(4) If $45° \leq \theta \leq 135°$ or $225° \leq \theta \leq 315°$, the vertical fashion spoke filling is applied as follows. For example, when $45° \leq \theta \leq 90°$, the foregoing steps are changed into $y_i' = r \cos\theta \cot\theta'$. If $y_i - y_i' > 1$, there is at least a spoke occurrence, and the series $y_{i+1} = y_i - 1$ is constructed till $y_{i+m} - y_i' \leq 1$, such that the m points $(x_i, y_{i+1}), (x_i, y_{i+2}), \ldots, (x_i, y_{i+m})$ are filled up.

The U.S. Pat. No. 5,530,450 issued to Sohn et al. relates to a spoke filling method wherein the sweep line plane is divided into four regions (region 0~3), as shown in FIG. 3. Two adjacent regions are such that the number of sweep lines of the outward region is the double increase of that of the inward region. This specific arrangement allows the spokes at long distance from the reference center to be filled.

The U.S. Pat. No. 5,554,992 issued to Toth et al. discloses a spoke filling method similar to the method of Sohn. The difference specifically lies in the applying of hyperbolic curves to divide the sweep line region, wherein the multiple increase of the sweep lines begins at the point which is the first spoke from the reference center (called "break point").

Some phenomena should be considered from the foregoing conventional methods. Thomas et al.'s method may be deficient when the sweep line meets two adjacent points $(x_i, y_i)$ and $(x_{i+1}, y_i)$ with the same coordinate $y_i$ as shown in FIG. 4, which causes a collision. As a result, the spoke filling cannot be effectively completed. Moreover, a lot of memories are needed to store $(\cos\theta \tan\theta')$ numerical values and $(\cos\theta \cot\theta')$ numerical values.

With respect to the methods of Sohn et al. and Toth et al., the collision is unfavorably frequent. Besides, the design of the electrical circuit to implement the methods is relatively complicated and the usage of memory is increased.

SUMMARY OF THE INVENTION

A major aspect of the present invention is to provide a method of spoke filling for radar scan converter and also a processing unit that implements the same method in which the spoke filling can be efficiently performed while the collision issue is overcome.

To attain the foregoing and other objectives, the present invention provides a method of spoke filling for radar scan converter that, according to a preferred embodiment, comprises first, comparing the coordinate sector of a second sweep line with the coordinate sector of a first sweep line, wherein both adjacent sweep lines are referred to as respectively a present sweep line and a previous sweep line. The comparison of the coordinate sector values determines whether either a horizontal fashion or a vertical fashion spoke filling should be applied. If the coordinate sector of the second sweep line is different from the coordinate sector of the first sweep line, the sector value and the points of the second sweep line with their respective video value are stored in a memory. If the coordinate sector of the second sweep line is identical to that of the first sweep line, the sector value and each of the points of the second sweep line with their video value are stored in a buffer. The spoke filling thus is performed between the first sweep line points stored in the memory and the second sweep line points stored in the buffer. The determination of whether either a horizontal or vertical spoke filling should be applied is in accordance with the coordinate sector value stored in the buffer (that is the sector value of the second sweep line). Then, each of the cartesian points of the second sweep line is compared to each of the corresponding cartesian points of the first sweep line to obtain either an abscissa or ordinate difference, wherein the corresponding cartesian point of the first sweep line is, according to either a horizontal or vertical spoke filling, either the point that has the same ordinate or the point that has the same abscissa. If the difference is greater than +1 or less than −1, all the points that are located between the cartesian point of the second sweep line and the cartesian point of the first sweep line are filled with the video value of the point of the second sweep line; if the difference is equal to +1 or −1, the cartesian coordinates of the point of the second sweep line with its video value and the coordinate sector of the second sweep line are stored in the memory to update respectively the cartesian coordinates of the point of the first sweep line with its video value and the coordinate sector of the first sweep line; and if the difference is equal to zero, the maximum value between the video value of the point of the first sweep line and the video value of the point of the second sweep line is chosen to update the video value of the first sweep line.

To attain the foregoing and other objectives, the present invention provides, according to another embodiment, a radar scan converter that comprises a buffer, an overlay processor and a spoke filling processing unit. The buffer, when receiving a read signal from the spoke filling processing unit, provides the spoke filling processing unit with the coordinate sector, the cartesian coordinates, and the video value of the second sweep line. When a spoke point, between the first sweep line point and second sweep line point, has been processed, the spoke filling processing unit outputs the coordinates of the corresponding pixel to be filled with its corresponding intensity value to the overlay processor.

To accomplish the spoke filling according to the spoke filling method of the present invention, the spoke filling processing unit comprises a timing generator, a first and a second multiplexers, a memory and a finite state machine. The memory is directed to store contents related to the first sweep line, comprising the coordinate sector and the points of the first sweep line with their respective video value. The multiplexers are directed to process and provide the finite state machine with the contents related to the coordinates of the single point of the second sweep line that is currently processed. From the contents related to the points of the first sweep line and the contents of the points of the second sweep line and with the coordination of the timing generator, the finite state machine conducts the spoke filling between the first and second sweep lines by simultaneously taking into consideration collision occurrence.

By achieving the above spoke filling method with the above spoke filling processing unit, the spoke filling can be efficiently performed with a substantially small quantity of memory, while the collision can be avoided.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 11 is a table showing the contents of the memory.

DESCRIPTION OF THE PREFERRED EMBODIMENTS

Hereinafter embodiments of the present invention will be explained concretely with reference to the accompanied drawings.

Figure 5:
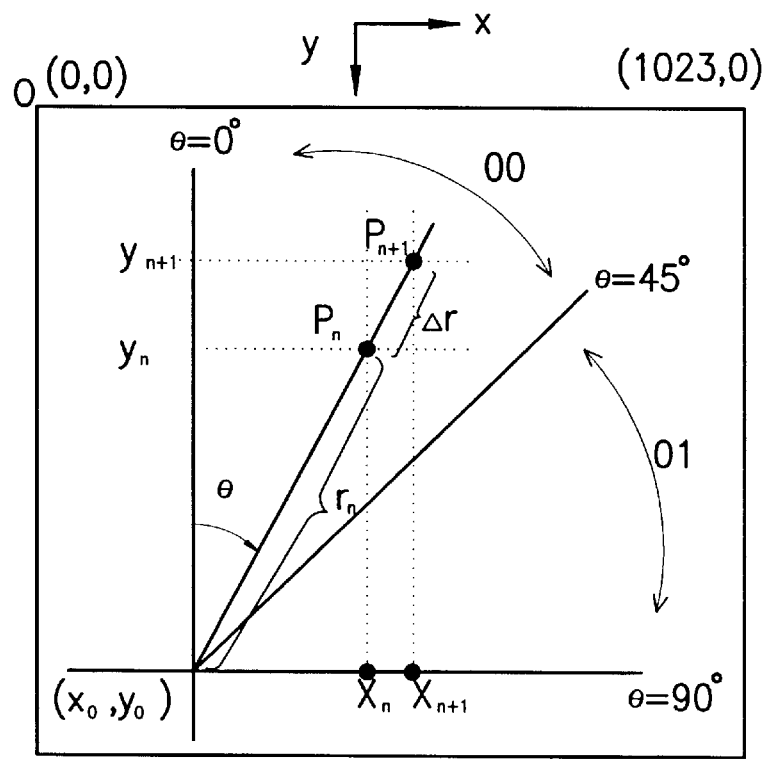
FIG. 5 shows a schematic view of the coordinate setting of the radar screen according to an embodiment of the invention.

FIG. 5 shows the coordinate setting of the radar screen according to an embodiment of the invention. The screen of the radar is defined according to the screen reference (O, x, y), the point O having the coordinates (0,0). The coordinate reference point of the radar is taken at the point $(x_0, y_0)$. The radar coordinate reference point is conventionally the position of the transmitter and also can be defined, differently from the example shown in FIG. 5, at the center of the screen. A sweep line $L_j$ and a second consecutive sweep line $L_{j+1}$ are considered. The coordinate conversion application {polar coordinates $(r, \theta) \rightarrow$ cartesian coordinates $(x, y)$} is:

$x_n = x_0 + r_n \sin \theta$ $y_n = y_0 - r_n \cos \theta$ thus $\Delta r = r_{n+1} - r_n$ and $x_{n+1} = x_n + \Delta x$ $y_{n+1} = y_n - \Delta y$ wherein $\Delta x = \Delta r \sin \theta$ $\Delta y = \Delta r \cos \theta$.

According to one major aspect of the embodiment of the present invention, the contents that are related to the first sweep line, comprising the coordinate sector, the coordinates $(x_p, y_p)$ of each point thereof with their video value, are recorded by a memory. The configuration of both the first sweep line and the second sweep line is determined via the coordinates $(x_n, y_n)$ of a point $P_n$ of the second sweep line and the use of a finite state machine such that the spoke filling and the memory updating can be decided. As a result, the calculation procedure of the spoke filling can take into consideration the factor of short, intermediate, and long distance points and through a same hardware structure, utterly fill all the spoke points.

According to the embodiment of the invention, a memory of 1K*20 bits is used to store the informations related to the first sweep line, as shown in FIG. 11. The data structure of the memory is as follows. There are a total of 1024 point positions on the sweep line. Consequently, the length of the memory address allocated space can be 1K, the value of the memory address depends on the coordinate sector value after the coordinate conversion into the x coordinate and the y coordinate has been performed. There are 10 bits that are allocated to the memory data, covering the range 0~1023. The intensity of the radar video is defined by a video value to which are allocated 8 bits. Two bits are allocated to the value of the coordinate sector, wherein the sector value is defined through the selection of the two highest bits of the azimuth synchronous signal (see the Az_sync signal of FIG. 1).

Figure 6:
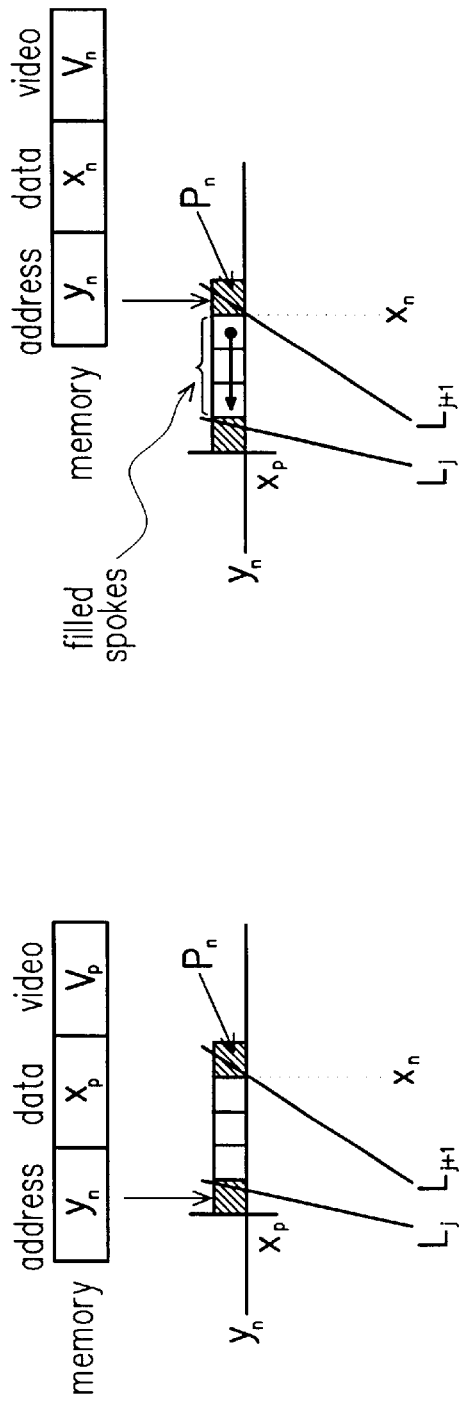
FIG. 6 and FIG. 7 show schematic views illustrating the calculation procedure of the spoke filling according to an embodiment in the invention.

Referring to FIG. 6, a horizontal spoke filling is schematically shown according to an embodiment of the present invention. The horizontal spoke filling is applied for a plurality of sweep lines that are, for example, in the zone delimited by $0° \leq \theta \leq 45°$. The sweep line $L_j$ (first sweep line) has the coordinate y of each of the pixel points thereof stored into the address variable field of the memory, while the x coordinate value is stored into the data variable field of the memory. If the sweep line $L_j$, for a same y coordinate value, has more than two points, the x coordinate value of the later point is chosen to be stored into the memory location as data variable. Orderly, the coordinates of the point $P_n$ of the following sweep line $L_{j+1}$ (second sweep line) are read, wherein the point $P_n$ has the coordinate $(x_n, y_n)$, wherein n=1, 2, 3, . . . , k (k is the total number of pixels on the sweep line that is considered).

For a point $P_n(x_n, y_n)$ of the video sweep line $L_{j+1}$ which video value is $V_n$, $x_{data}=x_n$ is set, the comparison with the data variable of the memory address $y_n$ (if the data variable is $x_p$, the video value is $V_p$) distinguishes the following different cases.

(1) If $x_n-x_p>1$, the horizontal fashion spoke filling strategy is adopted, such that $(x_n, y_p, V_n)$ is output to the screen, wherein the video value $V_n$ corresponds to that of the point $(x_n, y_n)$; then $x_n$ is set to $x_n=x_n-1$. This step is repeated till $x_n-x_p<1$, finally the value $x_{data}$ is stored into the memory location $y_n$.

(2) If $x_n-x_p=1$, $(x_n, y_n, V_n)$ is output to the screen, and the data variable is substituted for the value of $x_{data}$ ($=x_n$) at the memory address $y_n$.

(3) If $x_n=x_p$, the video value is selected from the peak value of the both points $(x_n, y_n)$ and $(x_p, y_n)$, that is max $(V_p, V_n)$.

After the above calculation procedure is achieved, the following point $P_{n+1}(x_{n+1}, y_{n+1})$ is selected, and step (1) to step (3) are repeated, wherein:

$x_{n+1}=x_n+\Delta x=x_n+\sin \theta$, $y_{n+1}=y_n-\Delta y=y_n-\cos \theta$ and if $\Delta r=1$, then $\Delta x=\Delta r\cdot\sin \theta=\sin \theta$, and $\Delta y=\Delta r\cdot\cos \theta=\cos \theta$.

Figure 7:
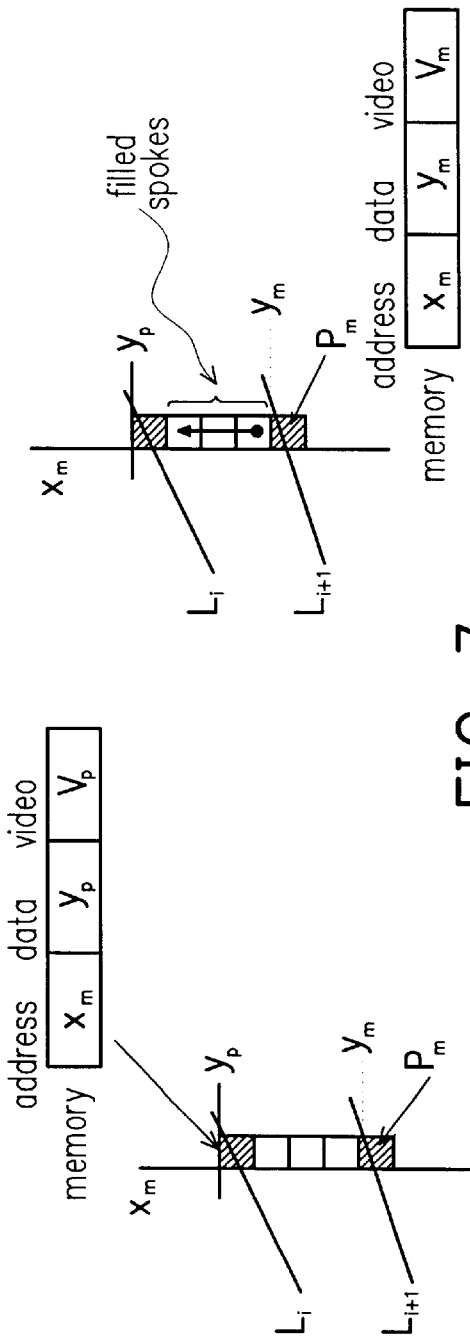

After the calculation procedure is completed for all the points of the sweep line $L_{j+1}$, the contents related to the sweep line $L_j$ saved in the memory are updated to those of the sweep line $L_{j+1}$. The previous calculation procedure then is applied again to the following sweep line by incrementing j, continuing till $\theta=45$ Referring to FIG. 7, a vertical spoke filling is schematically shown according to an embodiment of the present invention. In FIG. 7, where the sweep lines are, for example, in the zone delimited by $45° \leq \theta \leq 90°$, the vertical spoke filling is as follows. The coordinate x of each of the pixels of the sweep line $L_i$ (first sweep line) is stored into the address variable field of the memory, while the coordinate y is stored into the data variable field of the memory. If, for a same coordinate x, there are more than two points, the coordinate y of the later point is selected to be stored into the data variable field of the memory. Sequentially, the coordinate of each point $P_m$ of the video sweep line $L_{i+1}$ (second sweep line) are read, wherein the point $P_m$ has the coordinate $(x_m, y_m)$, wherein m=1, 2, 3, . . . , q (q is the total number of pixels of the sweep line $L_{i+1}$ that is considered).

For a point $P_m(x_m, y_m)$ of the sweep line $L_{i+1}$, the video value of which is $V_m$, $y_{data}=y_m$ is set, the comparison with the data variable of the memory address $x_m$ (if the data variable is $y_p$, the video value is $V_p$) leads to the following different cases.

(1) If $y_m-y_p>1$, the vertical fashion spoke filling strategy is adopted, such that $(x_m, y_m, V_m)$ is output to the screen, wherein the video value $V_m$ corresponds to that of $(x_m, y_m)$; then $y_m$ is set to $y_m=y_m-1$. This step is repeated till $y_m-y_p<1$, finally the value $y_{data}$ is stored into the memory address location $x_m$.

(2) If $y_m-y_p=1$, $(x_m, y_m, V_m)$ is output to the screen, and the data variable is substituted for the value of $y_{data}$ ($=y_m$) at the memory address $x_m$.

(3) If $y_m=y_p$, the video value is selected from the peak value of the both points $(x_m, y_m)$ and $(x_m, y_p)$, that is max $(V_p, V_m)$.

After the above calculation procedure is achieved, the following point $P_{m+1}(x_{m+1}, y_{m+1})$ is selected, and step (1) to step (3) are repeated, wherein:

$x_{m+1}=x_m+\Delta x=x_m+\sin \theta$, $y_{m-1}=y_m-\cos \theta$ and if $\Delta r=1$, then $\Delta x=\Delta r\cdot\sin \theta=\sin \theta$, and $\Delta y=\Delta r\cdot\cos \theta=\cos \theta$.

After the calculation procedure is completed for all the points of the sweep line $L_{i+1}$, the contents related to the sweep line $L_i$ that was saved in the memory are updated to those of the sweep line $L_{i+1}$. The above calculation procedure is applied again to the following sweep line by incrementing i, continuing till $\theta=90°$.

Figure 8:
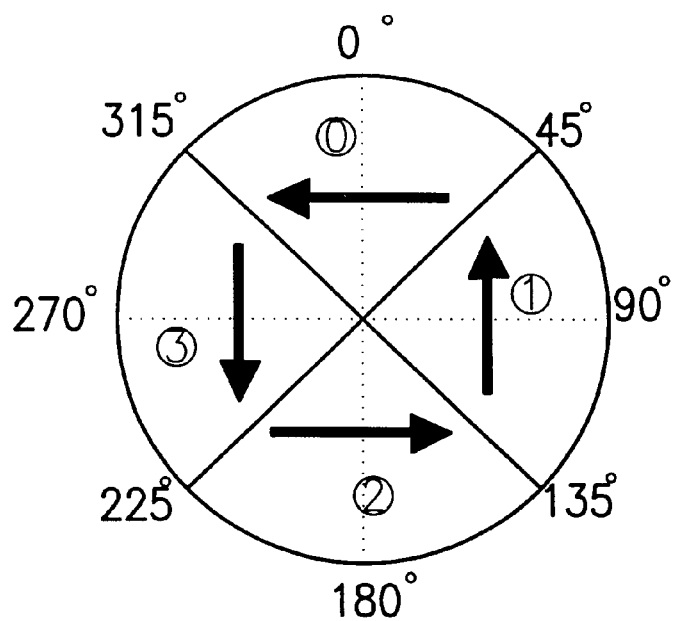
FIG. 8 shows the definition of the region of the coordinate sector.

FIG. 8 shows the four regions of the sweep line plane. In order to reduce the hardware cost, a memory set is communally used to store the first sweep line related informations. According to the different coordinate regions in which are the sweep lines, the definition of the contents that store the address variables and data variables fields is different. In FIG. 8, the address variable field of the memory, when the sweep lines are in the region 0 and the region 2 are defined by the coordinate value y, while the coordinate value x is the corresponding data variable field of the memory.

Differently, the address variable field of the memory, when the sweep line is in the region 1 and the region 3, is defined by the coordinate value x, while the coordinate value y is stored in the data variable field of the memory. The coordinate sector field of the memory is used to differentiate the region where the sweep line is located. For instance, if the sweep line is located in the region 0, the sector value is then 00, if the sweep line is located in the region 1, the sector value is then 01, etc.

Figure 1:
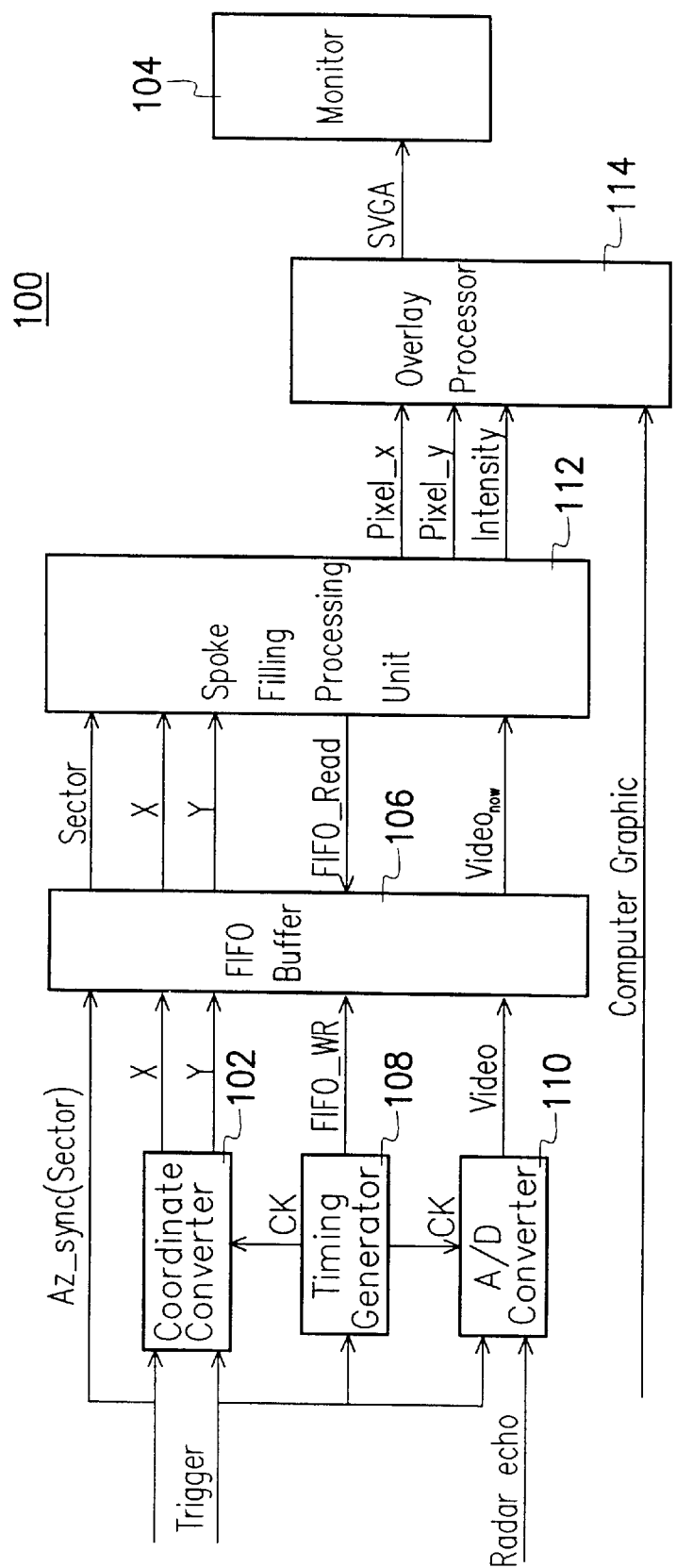
FIG. 1 shows a block diagram of the conventional radar scan converter.
Figure 2:
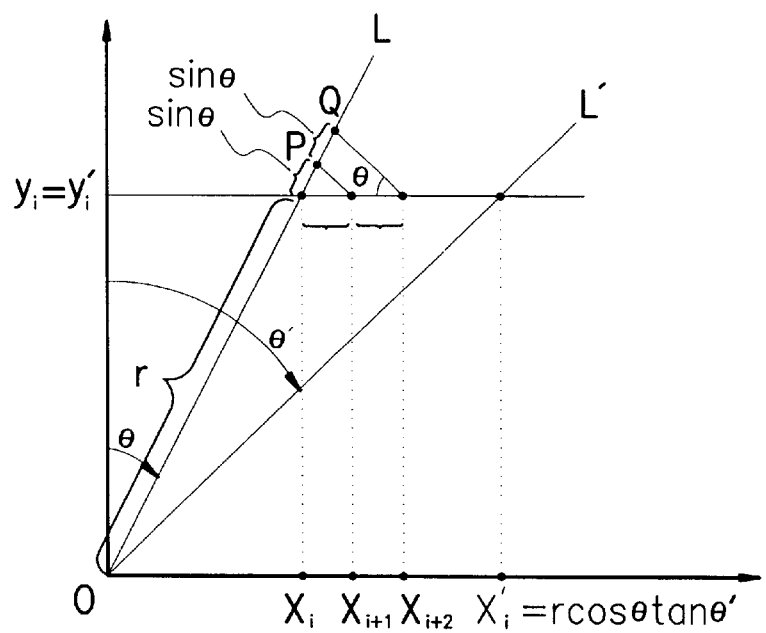
FIG. 2, FIG. 3, and FIG. 4 show various conventional methods of calculation procedure for spoke filling.
Figure 3:
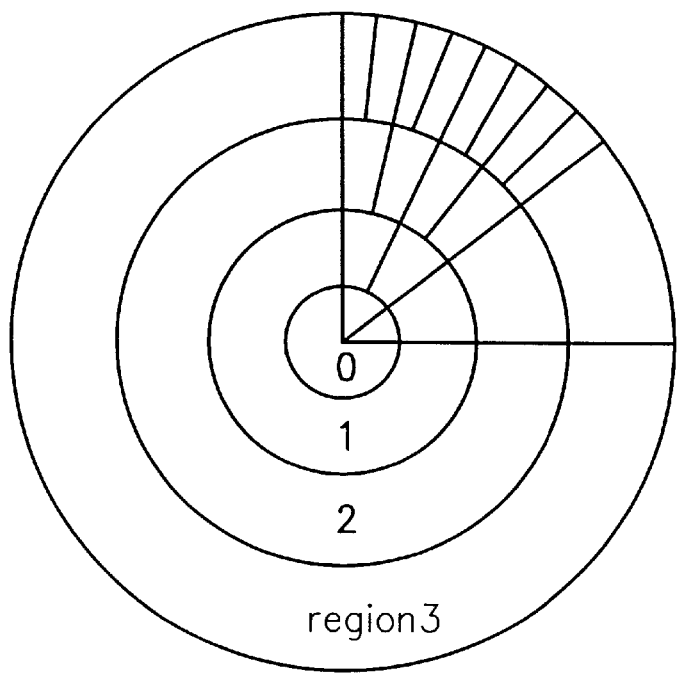
Figure 4:
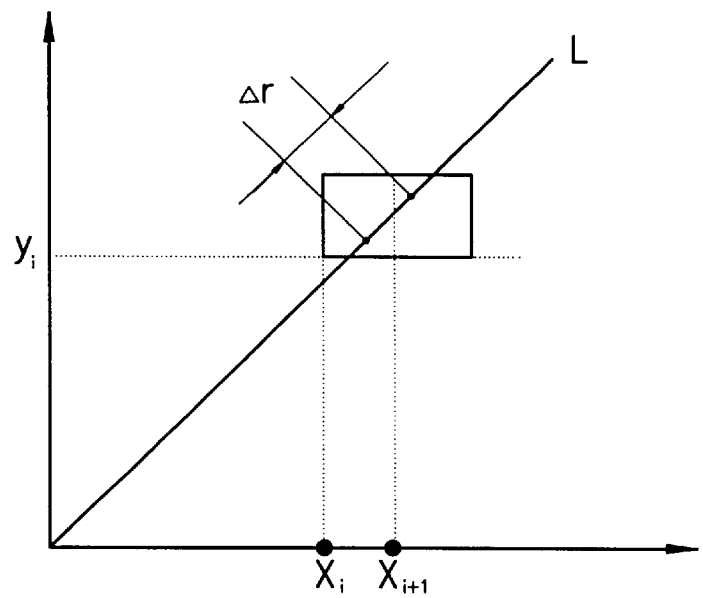
Figure 9:
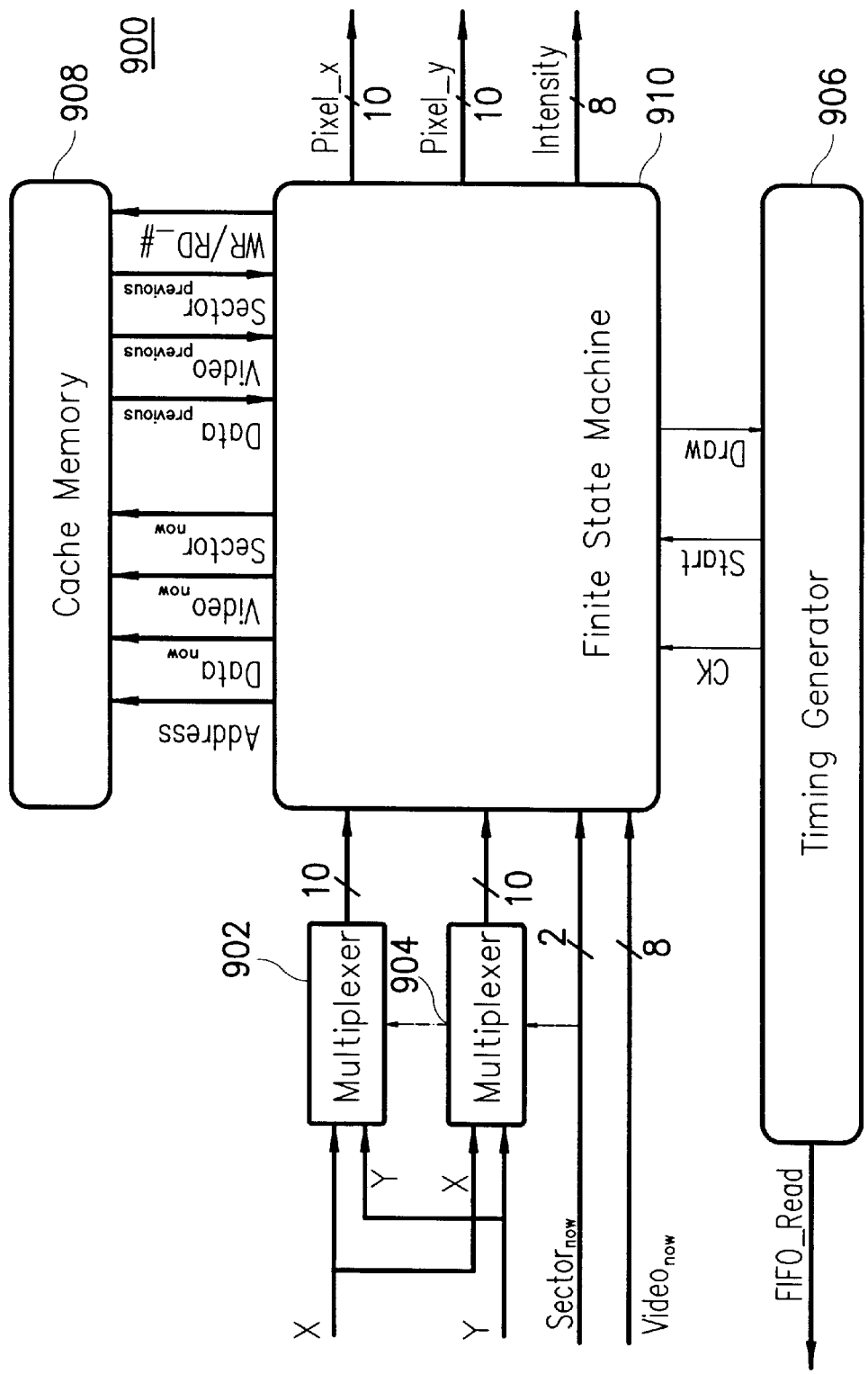
FIG. 9 shows a block diagram of the spoke filling processing unit according to an embodiment of the present invention.

Referring now to FIG. 9, a block diagram schematically shows a spoke filling processing unit according to an embodiment of the present invention. With reference to FIG. 9 and FIG. 1, the FIFO buffer 106 of the radar scan converter 100 outputs a coordinate sector value, a video value and cartesian coordinates (x, y) of the point of the second sweep line to the spoke filling processing unit 112. The spoke filling processing unit 112 outputs a read-in signal (FIFO_Read) to the FIFO buffer 106, and outputs a pixel ordinate value (Pixel_y), a pixel abscissa value (Pixel_x) and a brightness intensity value (Intensity) to the overlay processor 114.

As shown in FIG. 9, the spoke filling processing unit 900 comprises the multiplexers 902 and 904, the timing generator 906, the cache memory 908 and the finite state machine 910. The multiplexer 902, via its input nodes and its control node, respectively receives from the FIFO buffer 106 coordinate values (x, y) and a coordinate sector value. The multiplexer 902 has an output node that delivers a coordinate value x or y to the finite state machine 910.

Similarly, the multiplexer 904, via its input nodes and its control node, also respectively receives from the FIFO buffer 106 coordinate values (x, y) and a coordinate sector value, while an output node of the multiplexer 904 delivers a coordinate value x or y to the finite state machine 910.

The timing generator 906 sequentially outputs a read-in signal (FIFO_Read) to the FIFO buffer 106, receives a draw-point signal (Draw) from the finite state machine 910, and outputs a timing signal (CK) and a start signal (Start) to the finite state machine 910.

To update the contents of the cache memory 908, triggered by a write signal (WR/RD_#), the cache memory 908 receives from the finite state machine 910 an address variable (Address), a data variable ($Data_{now}$), a video value ($Video_{now}$), a coordinate sector value ($Sector_{now}$). With respect to the contents used in the calculation procedure for each pixel point, the cache memory 908 outputs a data variable ($Data_{previous}$), a video value ($Video_{previous}$) and a coordinate sector value ($Sector_{previous}$) to the finite state machine 910.

The finite state machine 910 receives from the FIFO buffer 106 a sector value ($Sector_{now}$) and a video value ($Video_{now}$) of the second sweep line, and outputs to the overlay processor 114 a pixel ordinate value (Pixel_y), a pixel abscissa value (Pixel_x) and the brightness intensity (Intensity) to fill the spoke points.

As shown in FIG. 9, the cache memory 908 is employed to record the informations that are related to the first sweep line. In the embodiment of the present invention, the resolution of the radar video frame is exemplary 1024×1024 pixels. Thus, at least 1K+20 bits are necessary for the memory to store the informations about the first sweep line, used in the spoke filling calculation procedure. The informations about the first sweep line are structured according to the following data structure. Inasmuch as the direction of the coordinate x and y at maximum has 1024 point positions, the length of the address variable field of the memory is 1K, while the data variable field of the memory can be 10 bits to represent the cartesian coordinate range 0~1023. The video value is represented as 8 bits in the memory. The coordinate sector value represents the region number that is saved up; since the sweep line plane according to the embodiment of the present invention is divided into 4 regions, the sector value can thus be assigned to 2 bits in the memory. Following now, the design of the finite state machine 910 for determining the spoke filling and updating the memory contents is described according to an embodiment of the present invention.

(1) First, a sampling of the radar video is taken and, according to the azimuth and the distance of the point from the radar coordinate reference, the polar coordinates are converted into cartesian coordinates: ($x_n$, $y_n$, $Video_{now}$)= Transform ($R_n$, $\theta_{az}$, $Video_{now}$). In order to spare the use of hardware, a set of addresses of the cache memory 908 is communally used to record the informations that are related to the first sweep line. The informations related to the first sweep line comprise, for each pixel point thereof, cartesian coordinate data variable, radar video value, and coordinate sector value. The coordinate sector value and the video value of the point are respectively stored into the memory sector field and memory video field and denoted as $Sector_{previous}$ and $Video_{previous}$. The coordinates of the point of the first sweep line are stored in both address variable field and data variable field of the memory respectively as Address and $Data_{previous}$. When the first sweep line is located in the region 0 or 2, the y coordinate is set to the address variable field of the cache memory 908. The finite state machine 910 consequently reads the x coordinate in the data variable field of the cache memory 908, and stores it in a register $Data_{previous}$ (not shown) of the finite state machine 910. In turn, the coordinate $x_n$ of the second sweep line point is stored into the register $Data_{now}$ (not shown) of the finite state machine 910. In contrast, when the first sweep line point is located in the region 1 or 3, the x coordinate is set to the address variable field of the cache memory 908. The finite state machine consequently reads the y coordinate in the data variable field of the cache memory 908, and stores it in the register $Data_{previous}$ (not shown), while the coordinate $y_n$ of the second sweep line point is stored into the register $Data_{now}$ (not shown).

The finite state machine 910 performs the spoke filling process through the following steps. According to the coordinate sector of the second sweep line, either the abscissa or ordinate of the cartesian point of the second sweep line is taken as the "Address". For example, in the coordinate sectors 0 or 2, since a horizontal spoke filling is performed, the ordinate of the cartesian point of the second sweep line is taken as the "Address" whereas the abscissa would have been taken as the "Address" in the coordinate sector 1 or 3 since a vertical spoke filling is performed therein. According the coordinate sector and the point of the sweep line, the finite state machine 910 thus takes out the values $Data_{previous}$, $Video_{previous}$, and $Sector_{previous}$ of the first sweep line at the "Address" of the cache memory 908.

(2) The coordinate sector value $Sector_{previous}$ of the first sweep line and the coordinate sector value $Sector_{now}$ of the second sweep line are compared to each other. If both values are not equal, the coordinate sector value $Sector_{previous}$ of the memory is updated to $Sector_{now}$ value, then the cartesian coordinates and video values of the second sweep line point are outputted, and step (1) is re-executed; otherwise step (3) is executed.

(3) The difference between $Data_{now}$ and $Data_{previous}$ is evaluated. According to the embodiment of the invention, four cases are distinguished from the result of the difference ($Data_{now}$–$Data_{previous}$):

(i) if the difference ($Data_{now}$–$Data_{previous}$) is greater than 1, then step (4) is executed;

(ii) if the difference ($Data_{now}$–$Data_{previous}$) is smaller than −1, step (5) is executed;

(iii) if the absolute value of the difference ($Data_{now}$–$Data_{previous}$) is equal to 1, then step (6) is executed; and (iv) if the difference ($Data_{now}$–$Data_{previous}$) is equal to 0, then step (7) is executed.

(4) In the case where the difference ($Data_{now}$–$Data_{previous}$) is greater than 1, if the cartesian point of the second sweep line is located in the region 0, then ($Data_{now}$, Address, $Video_{now}$) is read from the memory to fill the spoke; wherein ($Data_{now}$, Address, $Video_{now}$) respectively correspond to the parameters (Pixel_x, Pixel_y, Intensity); if the cartesian point of the second sweep line is located in the region 1, then (Address, $Data_{now}$, $Video_{now}$) is read. Moreover, $Data_{now}$ is decremented of 1, and step (3) is re-executed. The spoke filling for each of the points between the points of respectively $Data_{now}$ and $Data_{previous}$ is thus performed till the point of $Data_{previous}$ is attained.

(5) In the case where the difference ($Data_{now}$–$Data_{previous}$) is smaller than −1, if the cartesian point of the second sweep line is located in the region 2, then the ($Data_{now}$, Address, Video$_{now}$) is read respectively corresponding to (Pixel_x, Pixel_y, Intensity); if the cartesian point of the second sweep line is located in the region 3, then (Address, Data$_{now}$, Video$_{now}$) is read. Then, Data$_{now}$ is incremented of 1, and step (3) is re-executed. The spoke filling for each of the points between the points of respectively Data$_{now}$ and Data$_{previous}$ coordinates is thus performed till the point of Data$_{previous}$ coordinate is attained. Both steps (4) and (5) in the hardware can also be integrated into a single step.

(6) In the case where the absolute value of the difference (Data$_{now}$–Data$_{previous}$) is equal to 1, (x$_n$, y$_n$, Video$_{now}$) is read while the memory is updated, then step (1) is re-executed for the spoke filling of the next pixel point.

(7) In the case where the difference (Data$_{now}$–Data$_{previous}$) is equal to 0, there is occurrence of a collision; the video maximal value is then selected, and the memory is updated. The spoke filling is performed for the next pixel by returning to step (1).

Figure 10:
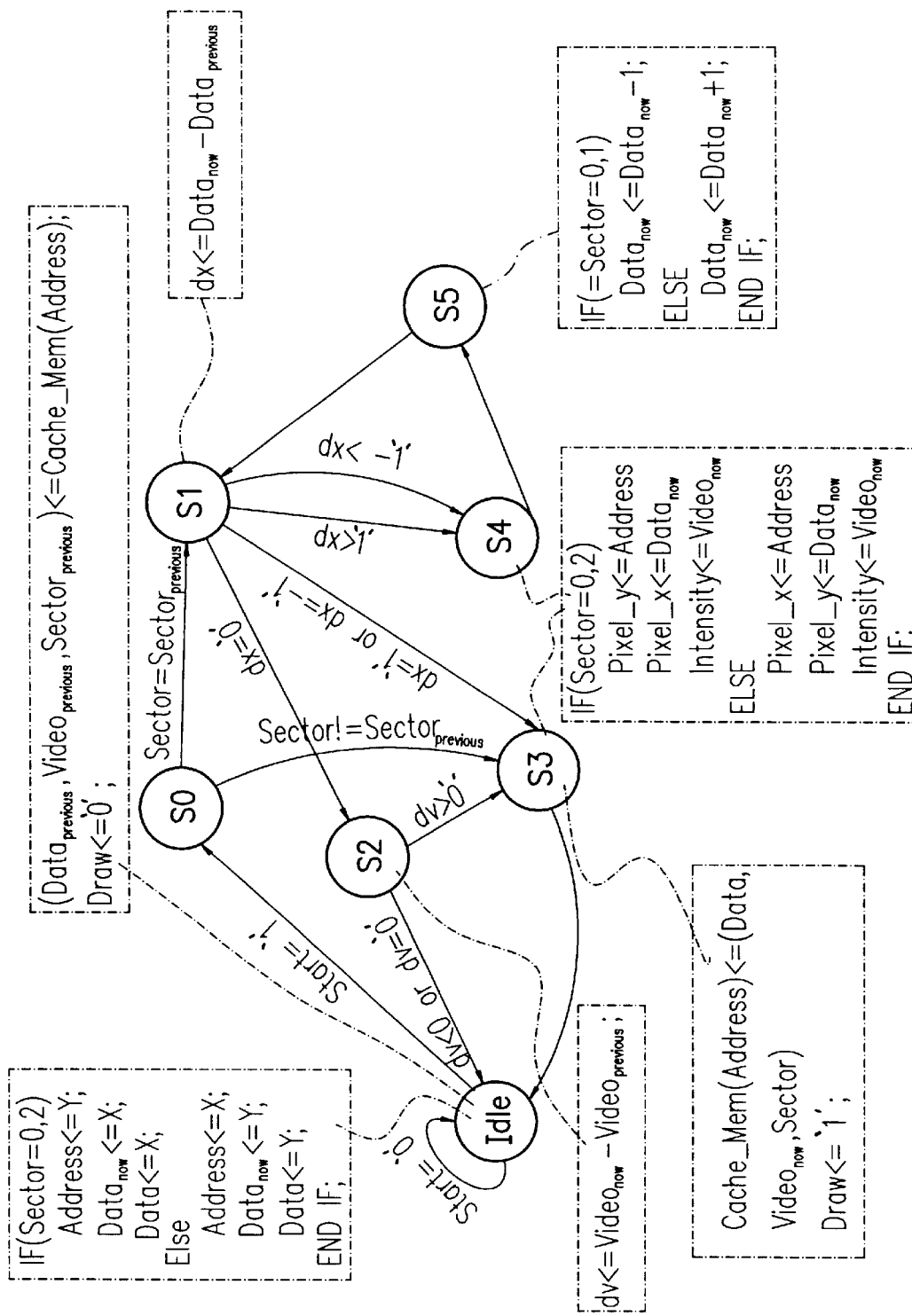
FIG. 10 shows the state/transition diagram of the finite state machine according to an embodiment of the invention.

FIG. 10 shows a diagram of the finite state machine used in the present invention, in accordance with the foregoing spoke filling method of the present invention. The states and transitions of the finite state machine are defined as follows.

State Idle (initial state): after the cartesian point of the second sweep line has been read from the FIFO buffer, according to the corresponding coordinate sector value of the second sweep line, determining whether the abscissa and the ordinate should be respectively represented as either the address variable and the data variable, or the data variable and the address variable; then, according to the value of the address variable, reading the contents of the corresponding address variable in the memory comprising the coordinate sector, the data variable of the abscissa or the ordinate, and the video value; waiting till start=1, then go to state S0; otherwise, stay at state Idle.

State S0: comparing the coordinate sector value of the second sweep line with the value of the first sweep line read from the cache memory to determine whether the coordinate sector values are identical; if they are identical then going to state S1, otherwise going to state S3.

State S1: comparing the current data variable and the data variable read from the cache memory, if the difference dx (Data$_{now}$–Data$_{previous}$) therefrom is equal to zero, then going to state S2; if the difference dx is equal to 1 or –1, then going to state S3; otherwise go to state S4.

State S2: comparing the video value of the second sweep line point with the video value of the first sweep line point read out from the cache memory; if the video value of the second sweep line point is relatively greater, then go to state S3, otherwise go to state Idle.

State S3: updating the cache memory by storing the sector value, the value of the data variable, and the video value of the point of the second sweep line into the cache memory at the memory address that corresponds to the value of the address variable. According to the coordinate sector value, respectively setting the address data variable and the video value to the pixel values that respectively are the abscissa, ordinate and intensity, or respectively the ordinate, abscissa and intensity; then going to state Idle.

State S4: according to the coordinate sector value, respectively setting the address variable, data variable and the video value to the pixel values that respectively are the abscissa, ordinate and intensity, or respectively the ordinate, abscissa and intensity; then going to state S5.

State S5: according to the coordinate sector of the second sweep line, incrementing or decrementing the data variable; then go to state S1.

When the collision occurs, the output of the new maximum value needs 5 timing cycles and the path is Idle→S0→S1→S2→S3→Idle. When there is no need to output any content of the memory, the path is then Idle→S0→S1→S2→Idle. When dx is equal to +1 or –1, the path is then Idle→S0→S1→S3→Idle. If it is needed to fill the spokes, the path then is Idle→S0→(S1→S4→S5→S1)→S3→Idle, wherein the brackets show one single loop to perform the spoke filling of one point. The number of loops that are performed thus indicates the number of spokes that are filled. Since the number of spoke filling points between two neighboring points is limited, the loop consequently cannot be infinite.

The foregoing description of embodiments and examples of the present invention shows at least the following advantages. The method of spoke filling for the radar scan converter via the spoke filling processing unit of the present invention is effectively carried out. The configuration of two consecutive sweep lines can be simply determined through the use of a finite state machine that has only 7 distinctive states. Besides, except for the look up table of sin θ and cos θ, only a memory of 1K*20 bits is used in the spoke filling processing unit of the present invention. Hence, the usage of memory amount used is substantially small.

It will be apparent to those skilled in the art that various modifications and variations can be made to the method and structure of the present invention without departing from the scope or spirit of the invention. In view of the foregoing, it is intended that the present invention cover modifications and variations of this invention provided they fall within the scope of the following claims and their equivalents.

What is claimed is:

1. A method of spoke filling for radar scan converter, the method comprising:

providing a sweep line plane that has a plurality of coordinate sectors and a plurality of ordered sweep lines defined thereon;

selecting a first sweep line and a second consecutive sweep line that are referred to as respectively the previous sweep line and the present sweep line, wherein the first and second sweep lines have respectively a plurality of defined cartesian points, each of the defined cartesian points having a defined video value, wherein the coordinate sector, cartesian points and video value thereof of the first sweep line are stored into a memory that comprises a address variable field and data variable field that store the cartesian coordinates of the points, and a coordinate sector field that stores the coordinate sector value;

comparing the coordinate sector of the second sweep line with the coordinate sector of the first sweep line to determine either a horizontal fashion spoke filing or a vertical fashion spoke filling is to be performed through;

if the coordinate sector of the first sweep line is different from the coordinate sector of the second sweep line, storing the cartesian coordinate values, the coordinate sector value and the video values of the entire sweep line; then processing the next sweep line;

if the coordinate sector of the first sweep line is identical to the coordinate sector of the second sweep line, determining from the coordinate sector of the first sweep line whether the comparison between each point of the first sweep line and the corresponding point of the second sweep line is performed along either a horizontal or vertical coordinate axis to obtain a coordinate difference;

if the coordinate difference is greater than +1, filling all the points that are located between the cartesian point of the second sweep line and the cartesian point of the first sweep line with the video value of the second sweep line point;

if the coordinate difference is smaller than −1, filling all the points that are located between the cartesian point of the second sweep line and the corresponding cartesian point of the first sweep line with the video value of the second sweep line point;

if the difference is exactly equal to +1 or −1, storing the cartesian coordinate value the coordinate sector value and the video value of the point of the second sweep line into the memory to respectively update the cartesian coordinate value, the coordinate sector value and the video value of the corresponding first sweep line point; and if the difference is equal to zero, updating the video value of the corresponding first sweep line point into the maximum value between the video value of the corresponding first sweep line point and the video value of the second sweep line point.

2. The method of claim 1, wherein the step of selecting the first sweep line and second sweep line further comprises:

converting a polar point of the second sweep line into the cartesian point of the second sweep line, wherein the coordinate sector and the cartesian point of the second sweep line with the video value thereof are stored into a buffer;

reading in the coordinate sector, cartesian point and the video value of the second sweep line from a buffer; and reading in the coordinate sector, cartesian point and the video value of the first sweep line from the memory.

3. The method of claim 1, wherein when the coordinate sector of the second sweep line is either the region defined between −45° and 45° or the region between 135° and 225°, the horizontal direction spoke filling hence is performed while, when the coordinate sector of the second sweep line is either the region between 45° and 135° or the region between 225° and 315°, the vertical fashion spoke filling is performed.

4. A spoke filling processing unit for radar scan converter, wherein the radar scan converter has a buffer and an overlay processor, the buffer delivering the coordinate sector value of the second sweep line, the cartesian coordinates of the point of the second sweep line and the video value to the spoke filling processing unit when the spoke filling processing unit outputs a read-in signal to the buffer, the spoke filling processing unit in turn outputs cartesian coordinate values and a corresponding intensity value to the overlay processor, the spoke filling processing unit comprising:

a first multiplexer that has a first and second data input nodes, a control node and a plurality of data output nodes, wherein the first and second data input nodes receives the abscissa and ordinate of the second sweep line point, while the control node receives the coordinate sector value and the data output nodes deliver a first selected value;

a second multiplexer that has a first and second data input nodes, a control node and a plurality of data output nodes, wherein the first and second data input nodes receive the abscissa and ordinate of the second sweep line point while the control node receives the coordinate sector value and the data output nodes deliver a second selected value;

a timing generator that outputs the read-in signal to the buffer, receives a draw point signal, and outputs a clock signal and a start signal;

a data storage unit that receives respectively an address variable and a data variable, a present video value, a present coordinate sector value, and a read-write signal, and outputs a previous data variable, a previous video value, and a previous coordinate sector value; and a finite state machine which receives a plurality of informations comprising the first selected value and the second selected value from the first and second multiplexers, both corresponding to the cartesian coordinates of the present point of the second sweep line, the present coordinate sector value and the present video value, the clock signal and the start signal from the timing generator, the previous data variable, the previous video value and the previous coordinate sector value from the cache memory, and which delivers distinctively the draw point signal to the time generator, the read-write signal, the present address variable, the present data variable, the present video value and the present coordinate sector to the cache memory, and the cartesian coordinate values, and the intensity value to the overlay processor.

5. The spoke filling processing unit of claim 4, wherein the data storage unit is a cache memory.

6. The spoke filling processing unit of claim 4, wherein the buffer is a FIFO buffer.

7. The spoke filling processing unit of claim 4, wherein the finite state machine comprises the following states:

State Idle (initial state): after the cartesian point of the second sweep line was read from the FIFO buffer, according to the corresponding coordinate sector value of the second sweep line, determining whether the abscissa and the ordinate should be respectively represented as either the address variable and the data variable, or the data variable and the address variable; then, according to the value of the address variable, reading the contents of the corresponding address variable in the memory comprising the coordinate sector, the data variable of the abscissa or the ordinate, and the video value; then waiting till start=1 to go to state S0; otherwise, stay at state Idle;

State S0: comparing the coordinate sector value of the second sweep line with the coordinate sector value of the first sweep line read from the cache memory to determine whether the coordinate sector value are identical; if they are identical then go to state S1, otherwise go to state S3;

State S1: comparing the current data variable with the data variable read from the cache memory, if they are identical, then going to state S2; if the difference is equal to 1 or −1, then going to state S3; otherwise going to state S4;

State S2: comparing the video value of the second sweep line point and the video value of the first sweep line point read out from the cache memory; if the video value of the second sweep line point is relatively greater, then go to state S3, otherwise go to state Idle;

State S3: updating the cache memory by storing the sector value, the data variable, and the video value of the point of the second sweep line into the cache memory at the memory address that corresponds to the value of the address variable; then according to the coordinate sector value, setting the address variable, data variable and the video value to the pixel values that are respectively the abscissa, the ordinate and the intensity, or respectively the ordinate, the abscissa and the intensity; then go to state Idle;

State S4: according to the coordinate sector value, setting the address variable, data variable and the video value to the pixel values that are respectively the abscissa, the ordinate and the intensity, or respectively the ordinate, the abscissa and the intensity; then going to state S5;

State S5: according to the coordinate sector of the second sweep line, incrementing or decrementing the data variable; then go to state S1.

* * * * *